United States Patent [19]

Turck

[11] 3,976,626

[45] Aug. 24, 1976

[54] PRODUCTION OF BINDERS FOR COATING COMPOSITIONS

[75] Inventor: Ulrich Turck, Marl, Germany

[73] Assignee: Chemische Werke Huls Aktiengesellschaft, Marl, Germany

[22] Filed: Mar. 28, 1975

[21] Appl. No.: 563,188

[30] Foreign Application Priority Data

Apr. 4, 1974 Germany............................ 2416481

[52] U.S. Cl.................................. 526/78; 526/86; 526/209; 526/225; 526/229; 526/303; 526/317; 526/342; 526/347; 526/336

[51] Int. Cl.².................. C08F 2/26; C08F 236/04; C08F 212/08

[58] Field of Search................. 260/80.7, 83.7, 84.3

[56] References Cited

UNITED STATES PATENTS

| | | | |
|---|---|---|---|
| 2,761,853 | 9/1956 | Uraneck et al. | 260/83.7 |
| 2,836,584 | 5/1958 | Wheelock et al. | 260/84.3 |
| 3,142,654 | 7/1964 | Peterson et al. | 260/80.7 |
| 3,188,304 | 6/1965 | Goshorn et al. | 260/84.3 |
| 3,471,591 | 10/1969 | Lindsey | 260/80.7 |
| 3,547,857 | 12/1970 | Murray | 260/83.7 |
| 3,843,584 | 10/1974 | Turck | 260/84.3 |

FOREIGN PATENTS OR APPLICATIONS

| | | |
|---|---|---|
| 1,064,721 | 9/1959 | Germany |
| 972,355 | 10/1964 | United Kingdom |

*Primary Examiner*—Alan Holler
*Attorney, Agent, or Firm*—Millen, Raptes & White

[57] ABSTRACT

Binders for coating compositions are produced by an elevated temperature, aqueous phase polymerization, in the presence of an anionic emulsifier, polyethylene oxide and peroxydisulfate, of a monomer mixture consisting by weight of 10–85% vinyl aromatic component, which may be partially replaced by 0–20% of acrylonitrile, 15–90% by weight of diolefin component and up to 6% each of $\beta$-unsaturated carboxylic acid or an amide thereof or a mixture thereof, characterized by employing a starting reaction mixture containing 0.05–0.5% of an anionic sulfonate or sulfate emulsifier; 0.5–5% of a polyethylene oxide having an average molecular weight of between 300 and 4,000; and 0.5–2% of a water-soluble peroxydisulfate; and, after a monomer conversion of between 15 and 35% by weight, adding to the reaction mixture another 0.2–1.5% of an anionic sulfonate or sulfate emulsifier.

9 Claims, No Drawings

PRODUCTION OF BINDERS FOR COATING COMPOSITIONS

BACKGROUND OF THE INVENTION

This invention relates to a process for the production of binders for coating compositions.

In the manufacture of latices for binders in coating agents, it is desirable to set an optimum size of the latex particles which, in the case of the binders of this invention, means relatively small particles (~ 1,000 – 2,000 A), since these ensure good film formation ("Farbe und Lack" 74, 561 [1968] and 79, 34 [1973]).

The desired particle size can be obtained in a simple manner by adding large amounts of emulsifier at the beginning of the polymerization. However, such a procedure is disadvantageous in two respects. First, such latices have a pronounced foaming tendency during use and second, they are rather unstable in spite of the high emulsifier content, since the surface energy of the particles increases rapidly on account of the reduced particle size.

These disadvantages can be avoided by adding an optimum amount of emulsifier, i.e., the precise quantity necessary to attain the desired particle size. Although such latices have a low foaming tendency, they are insufficiently stable due to the fact that the amount of emulsifier is too low.

A large number of experiments has been conducted to overcome these deficiencies. German Unexamined Laid-Open Application DOS No. 1,795,303 describes a feeding process wherein initially only a portion of the polymerization mixture is employed while the remainder thereof is gradually added during a longer time interval. However, that application acknowledges at page 9 that the process is difficult to handle. Moreover, it is technically expensive, for understandable reasons.

Another possibility for overcoming the above-described difficulties resides in beginning the polymerization with low amounts of emulsifier and adding the remaining quantities of emulsifier, distributed over the residual polymerization period, so gradually that no further appreciable particle formation is incurred which would lead to an undesirably small-particulate latex (DOS No. 1,645,527). However, this process also is technically expensive.

In order to avoid these cumbersome measures, the polymerization has been carried out in the presence of mixtures of anionic and nonionic emulsifiers, since the nonionic emulsifiers, although contributing toward the stabilization, do not affect the particle size to as great an extent. This process has the drawback that particles are formed which are too large in relationship to the amount of emulsifier used, especially if acrylic acid is used as the comonomer.

A further grave disadvantage of the process resides in that such polymerization systems tend toward the formation of gels (IEC 45, 1330 [1953]). Consequently, coatings produced from such latices are technically useless.

The additional use of polyethylene oxides in polymerization recipes is conventional (DOS No. 1,814,209). Latices produced according to the procedure of this reference have a large particle size and can be prepared only with a low solids content. Experiments have shown that latices with a high solids content according to DOS No. 1,814,209 contain very high proportions of coagulate and are unusable.

It is, therefore, an object of the present invention to avoid the disadvantages described above as inherent in the state of the art and to prepare a latex suitable for binders which is of a sufficiently small particle size, of low viscosity, and yet stable. Other objects will be apparent to those skilled in the art to which this invention pertains.

SUMMARY OF THE INVENTION

According to this invention, binders suitable for use in coating agents for paper and textiles are produced by the polymerization of monomer mixtures consisting, by weight, of 10–85% of a vinyl aromatic component, which may be partially replaced by 0–20% of acrylonitrile, 15–90% of a diolefin component, and 0–6% each of an $\alpha,\beta$-unsaturated carboxylic acid and an amide thereof, or a mixture thereof, in the aqueous phase and at an elevated temperature in the presence of an anionic emulsifier, a polyethylene oxide, and a peroxydisulfate, by a process which comprises employing a mixture containing at the beginning of the polymerization, by weight of the monomer mixture, 0.05 – 0.5% of an anionic sulfonate or sulfate emulsifier; 0.5 – 5% of a polyethylene oxide having an average molecular weight of between 300 and 4,000; and 0.5 – 2% of a water-soluble peroxydisulfate; and, after a monomer conversion of between 15 and 35% by weight, adding a further 0.2 – 1.5% by weight of the starting monomer mixture of a sulfonate or sulfate anionic emulsifier.

DETAILED DISCUSSION

Examples of suitable vinyl-aromatic monomers for the vinyl aromatic component of the starting monomer mixture are styrene and substituted styrenes or mixtures thereof. Styrene is preferably employed. The vinyl-aromatic component is employed in amounts of 10–85%, preferably 40–80%, by weight, of the starting mixture of monomers. A portion of the vinyl-aromatic monomer can be partially replaced by acrylonitrile, i.e., the amount of acrylonitrile in the starting mixture of monomers can be up to 20% by weight thereof.

Examples of suitable diolefin monomers for the diolefin component are butadiene and substituted butadienes, including isoprene and chlorobutadiene, and mixtures thereof. Butadiene is preferably employed. The diolefin component is employed in amounts of 15–90%, preferably 20–50%, by weight of the starting monomer mixture.

This invention relates both to latices of styrene/-butadiene-copolymers and to latices of copolymers of styrene, butadiene, an $\alpha,\beta$-unsaturated carboxylic acid and/or an amide thereof.

Suitable $\alpha,\beta$-unsaturated carboxylic acids are, for example, acrylic acid, methacrylic acid, maleic acid, fumaric acid, crotonic acid, or itaconic acid. Preferably employed is acrylic acid. The aforementioned acids can also be used in the form of their amides. Acrylamide is preferably utilized. The $\alpha,\beta$-unsaturated acids and/or the amides thereof are each utilized in amounts of 0–6%, preferably 1–3% by weight. If the carboxylic acid and the amide are used together, the above quantitative data refer to the sum of both components.

An especially preferred monomer mixture consists by weight or about 23–80%, preferably about 50–75%, styrene, about 20–70%, preferably about 25–50%, butadiene, and about 0–4%, preferably about 2–4%, acrylic acid, or acrylamide, or of a mixture of both unsaturated acid and unsaturated amide.

Examples of anionic sulfate and sulfonate emulsifiers are alkyl sulfates and alkyl sulfonates of 10–20, preferably 12–18 carbon atoms in the alkyl chain; alkyl benzenesulfonates of 8–12 carbon atoms in the alkyl chain; alkyl naphthalenesulfonates of 4–12 carbon atoms in the alkyl chain; salts of α-sulfo-fatty acids of 10–20 carbon atoms in the carbon chain; salts of sulfosuccinic acid esters of 6–12 carbon atoms in the alcohol component; alkyl diphenyl ether sulfonate of 8–18 carbon atoms in the alkyl chain; and salts of sulfated alkyl hydroxyethylates with 10–20 carbon atoms in the alkyl chain and salts of sulfated alkyl phenol oxyethylates with 8–12 carbon atoms in the alkyl chain, each with a degree of oxyethylation of 2 to 40

Of these anionic emulsifiers, 0.05 – 0.5%, preferably 0.1 – 0.3% by weight, based on the monomer mixture, is added to the charge at the beginning of the polymerization.

Suitable polyethylene oxides are those having an average molecular weight of 300 – 4,000, preferably about 400 – 1,500. They are employed in amounts of 0.5 – 5%, preferably 1–3% by weight, based on the monomer mixture.

A peroxydisulfate is employed as initiator in amounts of 0.5 – 2%, preferably 0.8 – 1.3% by weight, based on the monomer mixture. Examples are ammonium and metal, e.g., sodium and potassium, salts of peroxydisulfate, optionally in combination with sodium bisulfite or other reducing agents customary for this purpose. Ammonium peroxydisulfate is preferred because of its good water solubility.

An essential step of the present invention is a second, one-time addition of more anionic emulsifier in an amount of between 0.2 and 1.5%, preferably between 0.4 and 1.0% by weight, based on the original mixture of monomers. This further addition of emulsifier takes place at the instant where new polymer particles can no longer be formed, i.e., after a monomer conversion of at least about 15%. The addition of the further anionic emulsifier must be carried out before about 35% of the monomers has been converted, since otherwise a strong formation of coagulate occurs. Suitable anionic emulsifiers are those compounds recited above. The further added emulsifier need not necessarily be identical to that used originally at the beginning of the polymerization. The amount of emulsifier subsequently added is at least twice as much as the quantity used at the beginning of the polymerization.

Conventional regulators are usually used in customary amounts during the polymerization, such as, for example, tert.-dodecyl mercaptan. If a regulator is used, the latter can be added only when the particle-forming phase has been completed, i.e., after a monomer conversion of at least about 3%. The regulator should not be added after a monomer conversion of about 35% is achieved, since otherwise cross-linking reactions are encountered. Suitably, the regulator is added together with the second charge of anionic emulsifier.

The binders of this invention are produced by polymerization at elevated temperatures, usually between 45° and 90° C., preferably between 55° and 75° C. The temperature can be varied within this range during the reaction. When using acrylic acid as the comonomer, the reaction is conducted at an acidic pH. Adjustment of the pH ordinarily is unnecessary, since the desired value is automatically obtained due to the decomposition of the persulfate during the course of the polymerization.

The reaction time of a polymerization charge ordinarily ranges between about 8 and 24 hours, in most cases between 10 and 15 hours. During this time, a monomer conversion of at least 99.6% can be attained. The residual monomer content is usually below 0.1% and often cannot be detected at all. For this reason, the thus-obtained binders can normally be employed directly without any further treatment, such as, for example, stripping or deodorizing. After polymerization, the pH of the binders is usually adjusted to between 6 and 9 with the aid of bases, preferably ammonia, for stabilizing purposes.

The particle size of the binders ranges between 1,000 and 2,000 A, preferably between 1,200 and 1,700 A. The products of this invention are extensively monodisperse, i.e., the U-value $$U = \frac{\text{weight average of the particle diameter}}{\text{number average of the particle diameter}} - 1$$

is between 0.002 and 0.05, in most cases between 0.01 and 0.03.

When conducting the process of this invention, binders are obtained whose solids content ranges between 30% and 55% and preferably 45–52%. The binders have good electrolyte stability and thus possess an excellent compatibility with pigments and fillers. The coagulate proportion of the binders is below 1% and frequently is below 0.5%. The thus-obtained latices are essentially free of gels. Insofar as the binders contain carboxylic acid or carboxylic acid amide polymerized therein, they are stable with respect to 10% sodium chloride solution and in most cases also with respect to 2.5% calcium chloride solution.

The binders produced according to this invention are of low viscosity, i.e., the efflux time in a 4 mm. Ford beaker is under 25 seconds, usually under 20 seconds, by measurements conducted at a pH of 8.5, according to German Industrial Standard DIN 53211.

The essential and basic aspect of this invention resides in the sum total of all aforedescribed measures. Deviation from only one of the indicated permissible ranges of the variables results in an impairment of the properties of the resultant binders.

The amount of anionic emulsifier used at the beginning has an essential effect upon the particle size of the binder. If too great an amount is used, the thus-formed particles are too small. This resuls in a drop in stability and in an undesirably high binder viscosity. Also, such polymerization charges are prone to vigorous temperature increases and thus readily get out of control. When using amounts of emulsifier which are too low, the particle size becomes too high with a simultaneous increase in gel content. Furthermore, the polymerization times become uneconomically long.

The subsequently added quantities of emulsifier do not influence the particle size and are employed exclusively for stabilizing purposes. Therefore, it is unnecessary to use the same emulsifier as the one employed in the beginning. Any desired emulsifier described within the scope of this invention can be used. If the subsequent addition of emulsifier is more than 1.5% by weight of the starting monomer mixture, no substantial improvement in binder stability is attained and foam characteristic and water resistance of the binder are impaired.

According to the known state of the art (Encycl. Pol. Sci. Technol., Vol. 5, p. 806, J. Wiley & Sons, New York, 1966), the free monomer in emulsion polymerization charges has disappeared after a conversion of 50–60%. Therefore, any addition of emulsifier effected before this point leads to a renewed particle formation (DOS No. 2,103,610). It is, therefore, surprising that the polymerization charges of this invention have a different behavior and can be stabilized at a very early point in the polymerization by a further addition of emulsifier without the formation of new particles.

The peroxydisulfate employed in the process exerts a certain stabilizing effect. With too low a concentration thereof, a high proportion of coagulate results. The effect of the peroxydisulfate does not stem from an electrolyte effect, as evidenced by the fact that if a certain portion thereof is replaced by equimolar amounts of ammonium sulfate, a high proportion of coagulate is obtained. Too high a concentration of peroxydisulfate impairs the water resistance of the binder. If, in addition to styrene/butadiene, a carboxylic acid amide is also included in the monomer mixture, it is advantageous to use at least 0.8% by weight of activator.

If the activator is charged together with all components, the polymerization batch should be heated within at most 2 hours, preferably 1 hour, since otherwise undesirably large particles are obtained.

The additions of polyethylene oxide are essential to the process. Omission of these products results in very high proportions of coagulate, so that the thus-obtained binders are useless. However, too large an amount of polyethylene oxide results in a water resistance which is too low.

The molecular weight of the polyethylene oxide employed is likewise of importance. With an otherwise identical recipe, products having a proportion of coagulate of 40% are obtained if a polyethylene oxide having a molecular weight of <300 is employed. With molecular weights of >300, the proportion of coagulate drops substantially, and then rises again sharply at molecular weights of >4,000. With monomer mixtures which contain a carboxylic acid, it is advantageous to use polyethylene oxides having molecular weights of <1,500.

The process of this invention makes possible in a simple manner the production of stable, gel-free binders having the solids contents and viscosities required for coating agents. The properties of the binders can be simply adapted to any field of use by varying the different parameters. Thus, the process is eminently suitable for the production of binders for coatings in the textile and paper coating art.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The abbreviations used in the examples have the following meanings:

| | |
|---|---|
| PE 400, PE 600 and PE 1500 | polyethylene oxide having an average molecular weight of respectively 400, 600, and 1500 |
| emulsifier A | $C_{14}/C_{16}$-paraffin sulfonate |
| emulsifier B | dihexyl succinate sulfonate |
| emulsifier C | dioctyl succinate sulfonate |
| emulsifier D | nonyl phenol oxyethylate sulfate with an average degree of oxyethylation of 9 |
| emulsifier E | dodecyldiphenyl ether sulfonate |
| emulsifier F | $C_{16}/C_{18}$-fatty acid $\alpha$-sulfonate |

EXAMPLE 1

A 12-liter polymerization reactor is charged with the following:

| | |
|---|---|
| 120 | parts by weight of water |
| 60 | parts by weight of styrene |
| 1 | part by weight of PE 600 |
| 0.1 | part by weight of emulsifier A |
| 1 | part by weight of ammonium peroxydisulfate |

After purging with nitrogen, 40 parts by weight of butadiene is added, and the charge is heated to 70° C. At a monomer conversion of 20%, reached after 2 hours, 1 part by weight of emulsifier A and 0.5 part by weight of tert.-dodecyl mercaptan are added. The reaction is terminated after 18 hours; the residual monomer content of the charge is 0.3%; the solids content is 47.5% and the proportion of coagulate is 0.8%. The latex is free of gels. The efflux time in a 4 mm. Ford beaker is 13.0 seconds; the average particle diameter is 1,860 A; the U-value is 0.032.

EXAMPLE 2

A 12-liter polymerization reactor is charged with the following (parts by weight):

| | |
|---|---|
| 100 | water |
| 58 | styrene |
| 2 | acrylic acid |
| 1 | PE 600 |
| 0.1 | emulsifier A |
| 1 | ammonium peroxydisulfate |

After purging with nitrogen, 40 parts by weight of butadiene is added and the charge is heated to 70° C. At a monomer conversion of 17%, 0.4 part by weight of emulsifier A and 0.5 part by weight of tert.-dodecyl mercaptan are added. The reaction is terminated after 13½ hours. No residual monomers can be detected in the charge, whose solids content is 50.2% and proportion of coagulate content is 0.5%. The latex is free of gels and stable with respect to 10% sodium chloride solution. The efflux time in a 4 mm. Ford beaker is 14.2 seconds; the particle diameter is 1,600 A; the U-value is 0.005.

EXAMPLE 3

Example 2 is followed, except that the tert.-dodecyl mercaptan is omitted. The results correspond to those of Example 2. The latex is free of gels.

EXAMPLE 4

The procedure of Example 2 is followed except 2 parts by weight of acrylamide and 3 parts by weight of PE 600 are used in place of the acrylic acid. At a 20% monomer conversion, 1 part by weight of emulsifier A and 0.5 part by weight of tert.-dodecyl mercaptan are added. The reaction is terminated after 14½ hours. The contents of residual monomer is <0.01%. The solids content is 51.0% and the coagulate proportion is 0.5%. The latex is free of gels and stable with respect to 2.5% calcium chloride solution. The efflux time in a 4 mm. Ford beaker is 22.4 seconds.

EXAMPLE 5

The procedure of Example 4 is followed except 2 parts by weight of acrylic acid is additionally employed. The reaction temperature is 65° C. At a monomer conversion of 24%, 1 part by weight of emulsifier A and 0.5 part by weight of tert.-dodecyl mercaptan are added. The reaction is completed after 16 hours. The residual monomer content of the charge is 0.05%, the solids content is 51.1% and the coagulate proportion is 0.5%. The latex is free of gels and stable against 2.5% calcium chloride solution. The efflux time in a 4 mm. Ford beaker is 24.1 seconds.

EXAMPLE 6

The procedure of Example 4 is followed except 2 parts by weight of PE 600 and 2 parts by weight of ammonia peroxydisulfate are used. At a monomer conversion of 22%, 0.4 part by weight of emulsifier A and 0.5 part by weight of tert.-dodecyl mercaptan are added. After 13 hours, the reaction is completed. There is no residual monomer in the charge and the latex is gel-free and stable against 2.5% calcium chloride solution. The solids content is 51.1%, the proportion of coagulate is 0.4%. The efflux time in a 4 mm. Ford beaker is 16.9 seconds.

EXAMPLE 7

The procedure of Example 2 is followed except 0.5 part by weight of ammonium peroxydisulfate is used. At a monomer conversion of 15%, 1 part by weight of emulsifier A and 0.5 part by weight of tert.-dodecyl mercaptan are added. After 16 hours, the reaction is completed. The residual monomer content of the charge is 0.4%; the solids content thereof is 0.8% and the coagulate proportion is 0.8%. The dispersion is gel-free and stable against 10% sodium chloride solution. The efflux time in a 4 mm. Ford beaker is 19.6 seconds.

EXAMPLE 8

The following (parts by weight) are charged into a 12-liter polymerization reactor:

| | |
|---|---|
| 100 | water |
| 65 | styrene |
| 1 | acrylic acid |
| 1 | PE 600 |
| 0.05 | emulsifier A |
| 1 | ammonium peroxydisulfate |

After purging with nitrogen, 34 parts by weight of butadiene is added and the charge is heated to 70° C. At a monomer conversion of 16%, 1 part by weight of emulsifier A and 0.5 part by weight of tert.-dodecyl mercaptan are added thereto. After 14½ hours, the reaction is terminated. The residual monomer content of the charge is <0.01%, the solids content is 50.3% and the proportion of coagulate is 0.4%. The latex is free of gels and stable with respect to 10% sodium chloride solution. The efflux time in a 4 mm. Ford beaker is 14.4 seconds.

EXAMPLE 9

A 12-liter polymerization reactor is charged with the following (parts by weight):

| | |
|---|---|
| 100 | water |
| 48 | styrene |
| 2 | acrylamide |
| 0.5 | methacrylic acid |
| 3 | PE 1500 |
| 0.2 | emulsifier B |
| 1 | ammonium peroxydisulfate |

After purging with nitrogen, 50 parts by weight of butadiene is added and the charge is heated to 70° C. At a monomer conversion of 18%, 1 part by weight of emulsifier C and 0.5 part by weight of tert.-dodecyl mercaptan are added. The reaction is completed after 18 hours. The residual monomer content of the charge is 0.1%, the solids content is 51.8% and the proportion of coagulate is 0.7%. The latex is free of gels and resistant to 2.5% calcium chloride solution. The efflux time in a 4 mm. Ford beaker is 17.6 seconds.

EXAMPLE 10

A 12-liter polymerization reactor is charged with the following (parts by weight):

| | |
|---|---|
| 120 | water |
| 76.5 | styrene |
| 3 | acrylamide |
| 0.5 | methacrylic acid |
| 3 | PE 600 |
| 0.2 | emulsifier D |
| 1 | ammonium peroxydisulfate |

After purging with nitrogen, 20 parts by weight of butadiene is charged into the reactor and the reaction mixture is heated to 65° C. At a monomer conversion of 25%, 1 part by weight of emulsifier D and 0.2 part by weight of tert.-dodecyl mercaptan are added. After 8 hours, the reaction is completed. No residual monomers are in the charge; solids content is 45.5%; coagulate proportion is 0.7%. The latex is free of gels and stable with respect to 2.5% calcium chloride solution. The efflux time in a 4 mm. Ford beaker is 14.1 seconds.

EXAMLE 11

The following (parts by weight) are filled into a 12-liter polymerization reactor:

| | |
|---|---|
| 100 | water |
| 28 | styrene |
| 1 | acrylic acid |
| 1 | crotonic acid |
| 3 | PE 400 |
| 0.2 | emulsifier E |
| 0.8 | ammonium peroxydisulfate |

After purging with nitrogen, 70 parts by weight of butadiene is introduced and the charge is heated to 65° C. At a monomer conversion of 19%, 0.8 part by weight of emulsifier E and 0.6 part by weight of tert.-dodecyl mercaptan are added. After 10 hours, the temperature is increased to 70° C. After 18 hours, the reaction is terminated. The residual monomer content is 0.4% and solids content is 50.9%. Coagulate proportion is 0.5%. The latex is free of gels and resistant to 10% sodium chloride solution. The efflux time in a 4 mm. Ford beaker is 16.7 seconds.

EXAMPLE 12

A 12-liter polymerization reactor is charged with the following (parts by weight):

| | |
|---|---|
| 120 | water |
| 23 | styrene |
| 15 | acrylonitrile |
| 1 | acrylic acid |
| 1 | methacrylic acid |
| 2 | PE 400 |
| 0.3 | emulsifier F |
| 0.7 | ammonium persulfate |

After purging with nitrogen, 60 parts by weight of butadiene is charged into the reactor and the charge is heated to 70° C. At a monomer conversion of 20%, 1 part by weight of emulsifier A and 0.5 part by weight of tert.-dodecyl mercaptan are added. The reaction is terminated after 14 hours. The residual monomer content is 0.3%, the solids content is 45.0% and the proportion of coagulate is 0.9%. The latex is free of gels and resistant to 10% sodium chloride solution. The efflux time in a 4 mm. Ford beaker amounts to 12.7 seconds.

COMPARATIVE EXAMPLE A

This comparative example corresponds to Example 1 of DOS No. 1,814,209, but using 100 parts by weight of water. The following (parts by weight) are filled into a 12-liter polymerization reactor:

| | |
|---|---|
| 100 | water |
| 65 | styrene |
| 1 | acrylic acid |
| 0.5 | tert.-dodecyl mercaptan |
| 1 | PE 600 |
| 0.05 | emulsifier A |
| 0.5 | potassium peroxydisulfate |
| 0.001 | $Fe(NH_4)(SO_4)_2 \cdot 12 H_2O$ |

After purging with nitrogen, 34 parts by weight of butadiene is introduced and the charge is heated to 70° C. After 11 hours, the reaction is terminated. The latex contains 30% of coagulate.

COMPARATIVE EXAMPLE B

This comparative example corresponds to Comparative Example A, but using 120 parts by weight of water. The proportion of coagulate is still 7% and the latex is very unstable.

COMPARATIVE EXAMPLE C

This comparative example corresponds to Comparative Example A, but omitting the addition of the iron salt and using as initiator 1 part by weight of ammonium peroxydisulfate. The proportion of coagulate is 2%. The latex contains many gels and is very unstable.

COMPARATIVE EXAMPLE D

This comparative example corresponds to Example 1, but using instead of PE 600 a lauryl oxyethylate having an average degree of oxyethylation of 17. At a monomer conversion of 20%, reached after 4 hours, 1 part by weight of emulsifier A and 0.5 part by weight of tert.-dodecyl mercaptan are added. The reaction is completed after 24 hours. Residual monomer content is 0.3%, solids content is 47.5% and the proportion of coagulate is 3.0%. The efflux time in a 4 mm. Ford beaker is 12.8 seconds, the particle diameter is 2,340 A, the U-value is 0.055.

COMPARATIVE EXAMPLE E

This comparative example corresponds to Example 2, but using instead of PE 600 a lauryl oxyethylate having an average degree of oxyethylation of 17. At a monomer conversion of 17%, 0.4 part by weight of emulsifier A and 0.5 part by weight of tert.-dodecyl mercaptan are added. The reaction is terminated after 16 hours. The s-lids content is 50.2% and the proportion of coagulate is 1%. The latex contains gels. A bimodal distribution results ($D_{N1}$ 1,560 A, $D_{N2}$ 2,160 A).

COMPARATIVE EXAMPLE F

This comparative example corresponds to Example 7, except that 0.4 part by weight of ammonium peroxydisulfate and 0.4 part by weight of ammonium sulfate are employed. At a monomer conversion of 15%, 1 part by weight of emulsifier A and 0.5 part by weight of tert.-dodecyl mercaptan are added. The reaction is completed after 26 hours. Residual monomer content is 0.6%. The dispersion contains a large amount of gels.

COMPARATIVE EXAMPLE G

This comparative example corresponds to Example 2, but omitting the polyethylene oxide and without the subsequent introduction of anionic emulsifier. The latex contains 35% of coagulate.

COMPARATIVE EXAMPLE H

This comparative example corresponds to Comparative Example G, but adding 1 part by weight of emulsifier A at a monomer conversion of 17%. The latex contains 12% of coagulate.

COMPARATIVE EXAMPLE I (Adding Excessive Amounts of Anionic Emulsifier)

This comparative example corresponds to Example 4, but using 0.6 part by weight of emulsifier A and adding, at a monomer conversion of 16%, 1.2 parts by weight of emulsifier A. The thus-obtained dispersion is very viscous and contains 5% of coagulate. Already in the acidic pH range, the latex has an efflux time of 30 seconds using a 4 mm. Ford beaker.

COMPARATIVE EXAMPLE K (Subsequent Addition of Emulsifier at Too High a Conversion This comparative example corresponds to Example 4, except the anionic emulsifier is added to a monomer conversion of 42%. The proportion of coagulate is 8%.

COMPARATIVE EXAMPLE L (Determination of the Limit for the Activator Content)

This comparative example corresponds to Example 4, but using only 0.4 part by weight of ammonium persulfate as the initiator. The conversion is arrested at 82%. The reaction is stopped after 17 hours. The latex contains 5% of coagulate and is very unstable.

COMPARATIVE EXAMPLE M

This comparative example corresponds to Comparative Example L, but additionally using 0.5 part by weight of ammonium sulfate. The conversion is arrested at 88%; the reaction is stopped after 16 hours. The latex contains 5% of coagulate and is very unstable.

COMPARATIVE EXAMPLE N

This comparative example corresponds to Example 2, except the tert.-dodecyl mercaptan is introduced into the polymerization reactor together with the monomers. The latex has a large number of gels.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a binder for coating agents wherein the binder is prepared by the polymerization, in the aqueous phase in the presence of an anionic emulsifier, polyethylene oxide and peroxydisulfate and at an elevated temperature, of a monomer mixture consisting by weight of 10–85% of vinyl aromatic component, which may be partially replaced by 0–20% of acrylonitrile, and 15–90% of a diolefin component, 0–6% of $\alpha,\beta$-unsaturated carboxylic acid, and 0.–6% of an amide of an $\alpha,\beta$-unsaturated carboxylic acid, which comprises employing a reaction mixture which contains at the beginning of the polymerization, by weight, based on the monomer mixture, about 0.05 – 0.5% of an anionic sulfonate or sulfate emulsifier; about 0.5 – 5% of a polyethylene oxide having an average molecular weight of between about 300 and 4,000; and about 0.5 – 2% of a water-soluble peroxydisulfate; and, after a monomer conversion of between about 15 and 35% by weight, adding to the reaction mixture another 0.2 – 1.5% by weight of starting monomer mixture of an anionic sulfonate or sulfate emulsifier.

2. A process according to claim 1, that the amount of emulsifier subsequently added is at least twice the amount of anionic emulsifier present at the beginning of the polymerization 3. A process according to claim 2, wherein the amount of anionic emulsifier present at the beginning of the polymerization is about 0.1 – 0.3% and the amount thereof subsequently added is about 0.4 – 1.0%.

4. A process according to claim 1, wherein a polymerization regulator is added together with the subsequently introduced emulsifier.

5. A process according to claim 1, wherein the vinyl aromatic is styrene and the diolefin is butadiene.

6. A process according to claim 1, wherein the anionic emulsifier is a sulfonate.

7. A process according to claim 6, wherein the anionic emulsifier is an alkyl sulfonate of 10–20 carbon atoms.

8. A process according to claim 1, wherein the polyethylene oxide has an average molecular weight of about 400 – 1,500.

9. A process according to claim 1, wherein the peroxydisulfate is ammonium peroxydisulfate.

* * * * *